United States Patent

[11] 3,628,767

| [72] | Inventor | Claude Lombard<br>Billancourt, France |
|---|---|---|
| [21] | Appl. No. | 888,509 |
| [22] | Filed | Dec. 29, 1969 |
| [45] | Patented | Dec. 21, 1971 |
| [73] | Assignees | Regie Nationale Des Usines<br>Renault Billancourt (Hauts de Seine),<br>France;<br>Automobiles Peugeot<br>Paris, France |
| [32] | Priorities | Oct. 11, 1968 |
| [33] | | France |
| [31] | | 169721;<br>Mar. 18, 1969, France, No. 6907781<br>Continuation-in-part of application Ser. No. 862,295, Sept. 30, 1969, now abandoned. This application Dec. 29, 1969, Ser. No. 888,509 |

[54] ELECTROMAGNET BALL VALVES
7 Claims, 5 Drawing Figs.

[52] U.S. Cl. .................................................. 251/139,
251/141, 251/332
[51] Int. Cl. ...................................................... F16k 31/06
[50] Field of Search ........................................ 251/139,
141, 129, 332, 333, 65; 137/DIG. 2

[56] References Cited
UNITED STATES PATENTS

| 3,107,893 | 10/1963 | Bashe ........................... | 251/332 X |
| 3,346,008 | 10/1967 | Scaramucci .................. | 251/332 X |
| 3,407,827 | 10/1968 | Follett ........................... | 251/65 X |
| 3,443,585 | 5/1969 | Reinicke ...................... | 251/141 X |

FOREIGN PATENTS

| 1,001,073 | 1/1957 | Germany...................... | 251/139 |
| 744,858 | 2/1956 | Great Britain................ | 251/65 |

*Primary Examiner*—Arnold Rosenthal
*Attorney*—Stevens, Davis, Miller & Mosher

ABSTRACT: Electromagnetic valve comprising a ball valve adapted to coact by magnetic attraction with the core of an electromagnet forming a passage for the fluid to be controlled and comprising a valve seat formed at the end of said passage, characterized in that said seat consists of an inner conduit of flexible material and of a rigid outer collar adapted to be secured to said core, said inner conduit being retained in said collar on the ball side by the engagement of registering shoulders, and adapted to undergo a certain elastic distortion when said ball is attracted to its seated position.

ELECTROMAGNET BALL VALVES

This is a continuation-in-part of my copending application Ser. No. 862,295, filed Sept. 30, 1969, and now abandoned.

This invention relates in general to electromagnetic valves and has specific reference to improvements in ball-type valves of this character. Electromagnetic valves of which the movable member proper consists of a ball of magnetic material acting both as a magnetic core element and as a valve member have been known for a long time. When it is desired to obtain a very satisfactory fluidtightness, the component element of these valves must be machined with precision and more specifically care must be taken that the ball be properly centered on its seat.

This device may be adapted to tolerate a certain eccentricity likely to result from the assembling of its component elements by using a ball seat of flexible material. This seat may consist of an elastomer capable of withstanding particular service conditions, notably the action of hot oil; thus, polyacrylic synthetic rubber or a vinylidene-fluoride and hexafluoropropylene rubber—(Viton) may be used to this end. This rubber seat must be properly anchored in the fluid inlet conduit, otherwise the fluid pressure may eject the seat from its recess as heretofore observed with seat members consisting of O-rings; alternately, the seat element undergoes a certain thermal expansion and the desired gap between the ball and the core for preventing any detrimental remanence is eliminated.

It is the essential object of the present invention to avoid this inconvenience by providing a ball-type electromagnetic valve characterized in that the valve seat comprises an inner conduit of flexible material and an outer rigid collar adapted to be fitted into the valve core, said inner conduit being retained in said collar, on the ball side, by the engagement of corresponding or registering shoulders, said inner conduit being also adapted to undergo an elastic distortion when the ball is attracted.

This invention is also concerned with a specific form of embodiment of the inner conduit of flexible material, which cannot form beads likely to occlude the valve passage when the collar is compressed during the assembling operation, and to this end the shape of the flexible conduit is so designed that prior to said operation it comprises a cylindrical fluid passage on the ball side and a tapered portion flaring out in the opposite direction on the core side.

Other feature and advantages of this invention will appear as the following description proceeds with reference to the accompanying drawing illustrating diagrammatically by way of example typical forms of embodiment thereof. In the drawing.

Figure 1:
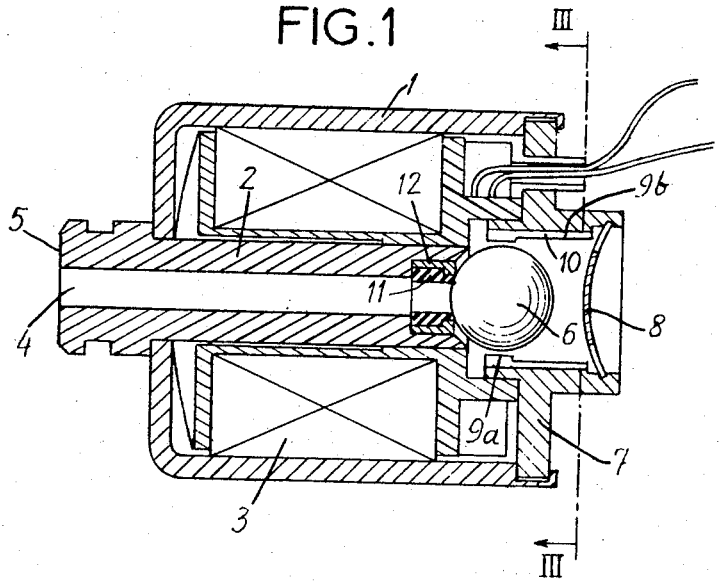
FIG. 1 is an axial longitudinal section showing an electromagnetic valve constructed according to the teachings of this invention.

The electromagnetic valve illustrated in FIG. 1 comprises a case of magnetic material of which one portion 1 constitutes the yoke and another portion 2 constitutes the core of a winding or coil-type electromagnet 3. This core 2 comprises a central passage 4 for introducing the fluid into the electromagnetic valve, and a connecting nipple or union 5 at its outer end. At the inner end of said passage 4 a ball 6 constituting the valve member is disposed in a chamber formed in an end cover 7 of magnetic material, which is fitted in the nonmagnetic coil shell and retained by crimping in the yoke 1.

The ball-enclosing chamber comprises a notched retaining or abutment disk 8 permitting the passage of fluid; this chamber also comprises two bores 9a and 9b of different diameters for guiding the ball, these bores being formed with flutes 10 permitting likewise the fluid flow; the first bore 9a adjacent the ball seat to be described presently is adapted to guide the ball valve 6 to and from its seat with a relatively small clearance of the order of 0.1 to 3 percent of its diameter; the other bore 9b into which the ball 6 is forced by the fluid flow provides a clearance of about 1 to 10 percent of its diameter to permit the passage through the valve of metal chips or like particles likely to circulate accidentally in the hydraulic circuit associated with this valve.

Figure 2:
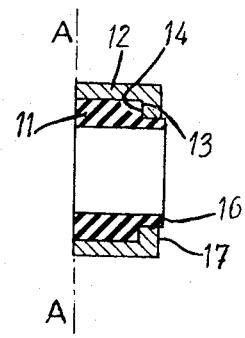
FIG. 2 is a detail view showing on a larger scale the seat member of the electromagnetic valve of FIG. 1.
Figure 3:
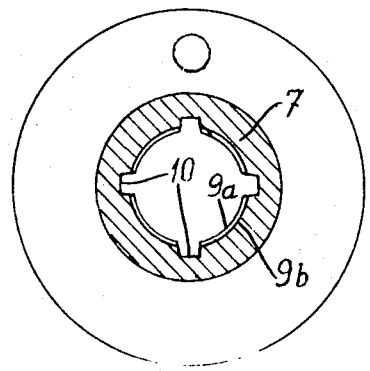
FIG. 3 is a cross-sectional view taken along the line III—III of FIG. 1.

The ball seat constituting an essential object of the present invention is illustrated more in detail and on a larger scale in FIG. 2. It consists of two sections, namely an inner conduit 11 of flexible material and an outer collar 12 of rigid material, adapted to be force fitted in the core 2 at the outlet end of passage 4. The inner conduit 11 is retained in said collar on the ball side by the engagement of corresponding shoulders formed at 13 in the conduit 11 and at 14 in the collar 12. Preferably, the end lip or edge 16 of the seat-forming conduit 11 projects slightly from the adjacent, flangelike end 17 of collar 12, whereby, even in case of eccentric assembling, the ball 6 will constantly remain in fluidtight engagement with the flexible conduit 11 of the seat device when said ball 6 is attracted by the electromagnet. By construction, this flexible conduit 11 is prestressed in all directions by the collar 12 and will preferably be molded with a mold joint disposed in the plane A—A of FIG. 2 in order to preserve a uniform projection of this conduit at 16 in relation to the collar 12.

It will also be seen that when the ball 6 is seated by the magnetic attraction produced when the coil 3 is energized, not only this ball 6 will engage the flexible conduit 11 so as to cause the elastic distortion thereof but on the other hand the collar 12 will act as an abutment member to limit the permissible ball movement towards the core, thus providing a minimum gap in the closed valve position (see FIG. 1) and safely avoiding any undesired remanence effect.

More particularly, to the same end, this form of embodiment may be provided with a ring 12 of nonmagnetic material and a ball 6 made entirely of magnetic material.

A modified form of embodiment preferred because it does not reduce the cross-sectional area of the magnetic circuit or path across the seat consists in utilizing a ring 12 of magnetic material and a ball 6 of magnetic material but coated with a layer of nonmagnetic material such as a copper layer obtained by electrolysis and representing from 1 to 5 percent of the ball diameter.

In case the ball were coated with nonmagnetic material, such as copper, the mechanical gap left between the ball and the taper formed at the registering end of core 2 will advantageously be zero, the ball being centered in this case on the tapered core end. Under these conditions the bore 9a can be dispensed with and only the larger bore 9b will extend throughout the length of the central portion of the end cover 7.

Figure 4:
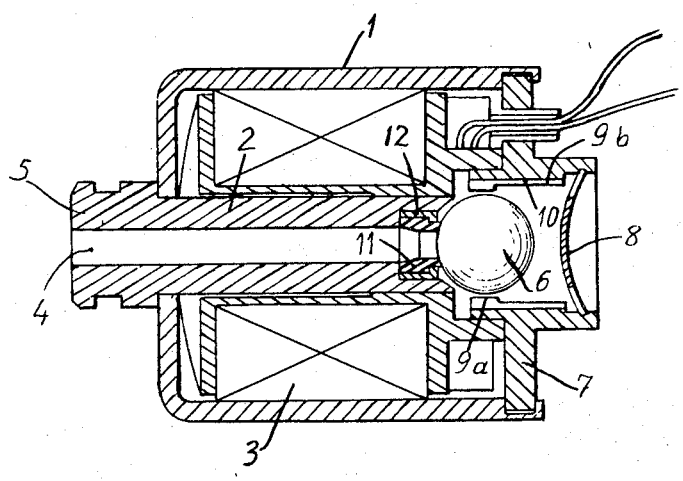
FIG. 4 is an axial longitudinal section showing a modified form of embodiment of the electromagnetic valve of this invention.
Figure 5:
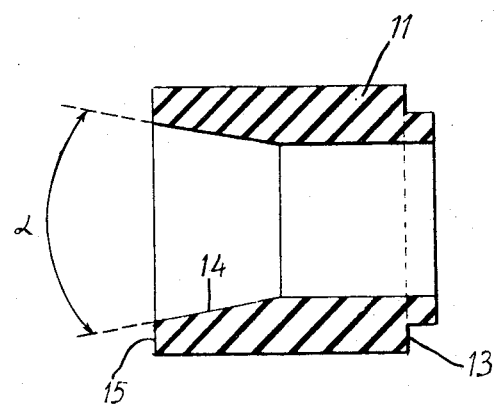
FIG. 5 is a detail view showing on a larger scale the flexible seat conduit of FIG. 4.

In the alternate form of embodiment illustrated in FIGS. 4 and 5 the valve seat consists likewise of two elements, i.e. a collar 12 force fitted in the core 2 and a conduit 11 of flexible material fitted in this collar 12. The flexible conduit 11 consisting for example of molded polyacrylic elastomer is retained in the collar 12 on the ball side by engaging a shoulder 13 of said collar. On the side of core 2 the inner diameter of the conduit 11 tapers gradually outwards from approximately the middle thereof, to form an outflared portion 14 having a vertex angle $\alpha$ of about 20°. Thus, the end face 15 of conduit 11 which engages the core 2 will not form any bead likely to occlude the conduit, as may occur when the inner passage of conduit 11 is cylindrical throughout its length.

Of course, various modifications and changes may be brought to the specific forms of embodiment of the present invention which are shown and described herein, without departing from the scope of the invention as set forth in the appended claims.

I claim:

1. An electromagnetic valve for controlling the flow of a fluid comprising a. an electromagnet having a central core, said core having a passage therein for the flow of said fluid,
b. a valve seat positioned within the core at one end of said electromagnet, said seat consisting of a rigid outer collar secured to the inner surface of said core and an inner conduit of flexible material, said outer collar and inner conduit being provided with registering shoulders for retaining said conduit within said collar,
c. a ball-enclosing chamber secured to said one end of said electromagnet, and
d. a magnetic ball located within said chamber and contacting the outer collar and inner conduit of said valve seat when said electromagnet is energized, the outer collar acting as an abutment to limit the movement of said ball and provide a minimum gap in the closed valve position, said inner conduit undergoing an elastic distortion when said ball is attracted to its seated position.

2. Electromagnetic valve according to claim 1 wherein the end face of said inner conduit, on the ball side, projects slightly from the adjacent end edge of said collar.

3. Electromagnetic valve according to claim 1 wherein said ball-enclosing chamber comprises two different bores, the bore having the smaller diameter being adjacent to said valve seat so as to permit the necessary cooperation between said ball and the inner conduit of flexible material.

4. Electromagnetic valve according to claim 1 wherein said inner conduit of flexible material provides a cylindrical fluid passage on the ball side and an opposite fluid passage tapering outwards on the core side.

5. Electromagnetic valve according to claim wherein the vertex angle of said tapered fluid passage is about 20° said tapered fluid passage beginning approximately in the middle of said conduit.

6. Electromagnetic valve according to claim 1 wherein said outer collar consists of nonmagnetic material and said ball consists entirely of magnetic material.

7. Electromagnetic valve according to claim 1 wherein said outer collar consists of magnetic material and said ball consists of magnetic material coated with a layer of nonmagnetic material.

* * * * *